Patented Oct. 29, 1935

2,019,275

UNITED STATES PATENT OFFICE 2,019,275

PROTECTION OF VEGETABLE MATTER AGAINST INJURIOUS ANIMAL LIFE

Philip Triest Sharples, Merion, Pa., assignor to The Sharples Solvents Corporation, Philadelphia, Pa., a corporation of Delaware No Drawing. Application July 17, 1931, Serial No. 551,564

2 Claims. (Cl. 167—22)

This invention relates to the protection of vegetable matter against injurious animal life.

It is well-known that vegetable matter including plants, bushes, trees, fruit, flowers and vegetables are injured or destroyed by various types of animal life including insects such as aphis and fruit flies, hard or scale-like animal organisms, and fungi, the term animal life being used herein for the purpose of designating such types of animals as distinguished from rodents and other animals which consume and destroy vegetable matter but are not contemplated herein.

It has been proposed hertofore to protect vegetable matter against such animal life as is herein contemplated, by spraying the vegetable matter with solutions of nicotine and of lead arsenate and by subjecting the vegetable matter to the action of hydrocyanic acid gas. Substances heretofore utilized in the form of solution are costly, or are available in limited quantities, or, particularly in the use of lead arsenate, are likely to remain in part upon fruit and vegetables and persons eating them are frequently poisoned; and the use of hydrocyanic acid gas is dangerous to those attempting to apply it and the application of the gas to the vegetable matter is difficult and costly and frequent applications are highly injurious to the vegetable matter.

I have discovered that certain derivatives of hydrocarbons possess effective insecticidal, germicidal and fungicidal properties, and that the substance herein referred to can be readily produced and employed as herein described for the protection of vegetable matter against injurious animal life.

By treating chlorpentane (amyl chloride) with ammonia, preferably in a common solvent such as alcohol, amyl amine is formed, having the general formula $C_5H_{11}NH_2$. By varying the relative proportions of ammonia and hydrocarbon halide final compounds will be obtained containing different numbers of hydrocarbon radicals. Thus, there may also be produced diamyl amine having the general formula $NH(C_5H_{11})_2$ and tri-amyl amine $N(C_5H_{11})_3$. These substances are all alkyl derivatives of ammonia, and may be obtained from chlorine derivatives of paraffin hydrocarbons.

Similarly, hexyl amine, dihexyl amine and trihexyl amine, including the various possible isomers thereof, may be produced from the monochlorhexanes. The present invention relates to the use of the tri-alkyl amines and particularly to the use of tri-amyl amine.

The following may be taken as an example of the production of tri-amyl amines but it is to be understood that they may be prepared in other ways. The commercial chlorination of pentanes obtained from natural-gas gasoline, in accordance with the process described in the patents of Eugene E. Ayres, Nos. 1,741,393 and 1,717,136, produces a mixture of monochlorpentanes of which the following is a typical example:

| | Percent |
|---|---|
| 1-Chlorpentane | 25 |
| 2-Chlorpentane | 17 |
| 3-Chlorpentane | 8.3 |
| 1-Chlor-3-methyl butane | 12.4 |
| 2-Chlor-3-methyl butane | 8.3 |
| 1-Chlor-2-methyl butane | 25 |
| 2-Chlor-2-methyl butane | 4 |

If such a mixture of amyl chlorides is treated with a small proportion of ammonia, say one to one and one half times the calculated molecular proportion necessary triamyl amine is formed. If the reaction is carried out in an aqueous solution with stirring while pressure is maintained, the reaction will begin at about 150° C. and will complete itself if the temperature is held between 180° C. and 190° C. for an appreciable time. When the ammonia is contained in a solvent such as alcohol in which amyl chloride also dissolves, the reaction may be completed in several hours at a temperature between 100° C. and 110° C. It is convenient to use a solution of ammonia in 50% alcohol, which is easily obtained by adding equal volumes of 95% alcohol and a 28% aqueous solution of ammonia. Apparently the amyl-ammonium chloride dissociates at the temperature of the reaction in the manner in which ammonium chloride is known to dissociate under the action of heat, and probably such dissociation is aided by the presence of excess of ammonia although the amyl amines are stronger bases than is ammonia. The amyl-ammonium chlorides are true salts and will not react with additional amyl chloride so long as they remain true salts, but when dissociated the amyl amine will react with additional amyl chloride to produce diamyl ammonium chloride which in turn may dissociate, giving free amine which will react with a still further additional quantity of amyl chloride to produce triamyl amine. In brief, the reactions are as follows:

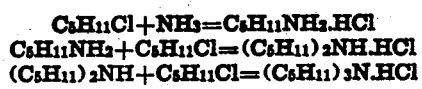

After these reactions have proceeded as far as they can be made to proceed, the amines are in solution in the supernatant liquid in the form of salts, and treatment with strong inorganic base which does not form reversible salts gives the free base from the salts that are in solution. An illustrative reaction of this type is as follows:

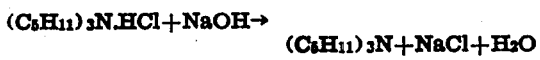

An excess of ammonia may be added originally to promote the dissociation and thereby promote the formation of the desired amine, by neutralizing the hydrochloric acid. In this case the excess of ammonia consists in the use of as many additional molecules of ammonia as there are molecules of hydrochloric acid formed, in addition to the ammonia necessary to react with the amyl chloride. As an alternative, there may be used a sufficient number of molecules of sodium hydroxide to react with the hydrochloric acid formed, using only enough ammonia to react with the amyl chloride.

As an example of an operation in which triamyl amines predominated in the final product, 2,130 grams of mixed amyl chlorides were placed in an autoclave, 125 grams of ammonia in 2,000 c. c. of alcohol were added, and then there was added a cold solution of 800 grams of sodium hydroxide and 2,000 c. c. of water. The closed autoclave was heated to temperatures between 130° C. and 145° C. with stirring for five hours. An initial gauge pressure of about 225 lbs. per square inch occurred and the pressure dropped as the reaction progressed. After the autoclave cooled 4,000 c. c. of cold water were added and the oil which separated was removed with a separatory funnel. The oil was dried over solid sodium hydroxide and distilled. A small quantity of monoamyl amines was recovered and also a quantity of amyl chloride, but the bulk of the product obtained consisted of about 200 grams of diamyl amine boiling between 165° C. and 205° C. and about 900 grams of triamyl amines boiling between 200° C. and 255° C. Thus, the yield of tri-amyl amine was in the neighborhood of 62% of the theoretical.

Tri-amyl amines obtainable from amyl chlorides are remarkably effective in the destruction of animal life injurious to vegetable matter, such as insects and fungi, apparently because of the fact that they are poisonous to such animal life, and it is believed that the effectiveness of these substances is possibly in part due to the fact that these substances are not only toxic but have the property of penetrating coatings produced by the animal life for its protection. Furthermore, the concentrations necessary to kill animal life are not toxic to plants.

The protection of the vegetable life against the injurious action of the animal life can be effected by applying to the animal life to be destroyed, either by application directly to the animal life or by application to the vegetable life to be protected, an aqueous solution of such of the above-mentioned amines as are water soluble or an emulsion of an organic solvent containing such of the above-mentioned amines as are soluble in organic solvents.

I claim:

1. A method of protecting vegetable matter against injurious animal life that comprises effecting a liquid phase contact of said vegetable matter and animal life by tri-amyl amine.

2. A method of protecting vegetable matter against injurious animal life that comprises effecting a liquid phase contact of said vegetable matter and animal life by an oil emulsion containing tri-amyl amine.

PHILIP TRIEST SHARPLES.